(12) United States Patent
Park et al.

(10) Patent No.: US 11,082,957 B2
(45) Date of Patent: Aug. 3, 2021

(54) METHOD AND DEVICE FOR CONFIGURING RESOURCE UNIT FOR TRANSMITTING UPLINK SIGNAL BY NB-IOT UE

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Seongnam-si (KR)

( * ) Notice: Subject to any disclaimer, the term of this patent is extended or adjusted under 35 U.S.C. 154(b) by 0 days.

(21) Appl. No.: 15/421,468

(22) Filed: Feb. 1, 2017

(65) Prior Publication Data
US 2017/0230962 A1    Aug. 10, 2017

(30) Foreign Application Priority Data

Feb. 4, 2016   (KR) .................. 10-2016-0014508
Sep. 26, 2016  (KR) .................. 10-2016-0123368

(51) Int. Cl.
| | |
|---|---|
| H04W 4/00 | (2018.01) |
| H04W 72/04 | (2009.01) |
| H04L 1/18 | (2006.01) |
| H04L 29/08 | (2006.01) |
| H04W 88/02 | (2009.01) |
| H04W 88/08 | (2009.01) |

(52) U.S. Cl.
CPC ....... *H04W 72/0413* (2013.01); *H04L 1/1861* (2013.01); *H04L 67/12* (2013.01); *H04L 1/1812* (2013.01); *H04W 88/02* (2013.01); *H04W 88/08* (2013.01)

(58) Field of Classification Search
CPC ............ H04W 72/0413; H04L 1/1806; H04L 1/1812; H04L 1/1861
See application file for complete search history.

(56) References Cited

U.S. PATENT DOCUMENTS

| | | | |
|---|---|---|---|
| 2011/0274079 | A1 | 11/2011 | Lee et al. |
| 2016/0337089 | A1 | 11/2016 | Chen et al. |

(Continued)

FOREIGN PATENT DOCUMENTS

| | | |
|---|---|---|
| CN | 102315897 A | 1/2012 |
| CN | 104767595 A | 7/2015 |

OTHER PUBLICATIONS

Sony, "Considerations on NB-PUSCH in NB-IoT", R1-160178, 3GPP TSG RAN WG1 NB-IoT Ad-Hoc Meeting, Budapest, Hungary, Jan. 18-20, 2016, pp. 1-4.

(Continued)

*Primary Examiner* — Bo Hui A Zhu
(74) *Attorney, Agent, or Firm* — Invenstone Patent, LLC

(57) ABSTRACT

Provided is a method for transmitting an uplink signal by a NarrowBand IoT (Internet of Things) UE and a device therefor. The method may include: receiving downlink data from a base station; generating HARQ ACK/NACK feedback information related to the downlink data; and transmitting the HARQ ACK/NACK feedback information to the base station through a Narrowband Physical Uplink Shared Channel (NPUSCH), wherein the NPUSCH is mapped to a resource unit configured by M subcarriers and K slots.

6 Claims, 10 Drawing Sheets

(56) References Cited

U.S. PATENT DOCUMENTS

| | | | | |
|---|---|---|---|---|
| 2017/0134129 | A1* | 5/2017 | You | H04W 4/70 |
| 2017/0171865 | A1* | 6/2017 | Hwang | H04B 1/713 |
| 2017/0311326 | A1* | 10/2017 | Wong | H04W 72/0453 |
| 2018/0077696 | A1* | 3/2018 | Lee | H04W 4/70 |
| 2018/0145802 | A1* | 5/2018 | Hwang | H04L 5/0005 |
| 2018/0367285 | A1* | 12/2018 | Yi | H04L 5/0055 |

OTHER PUBLICATIONS

Nokia Networks, "Uplink Control Information for NB-IoT", R1-160009, 3GPP TSG RAN WG1 NB-IoT Adhoc, Budapest, Hungary, Jan. 18-20, 2016, pp. 1-3.

LG Electronics, "Overall discussions on Uplink Transmission for NB-IoT", R1-160117, 3GPP TSG RAN WG1 NB-IoT Ad-Hoc Meeting, Budapest, Hungary, Jan. 18-20, 2016.

State Intellectual Property Office of People's Republic of China, Office Action of corresponding CN Patent Application No. 201710043604.8, dated Mar. 2, 2020.

* cited by examiner

METHOD AND DEVICE FOR CONFIGURING RESOURCE UNIT FOR TRANSMITTING UPLINK SIGNAL BY NB-IOT UE

CROSS REFERENCE TO RELATED APPLICATION

This application claims priority from Korean Patent Application Nos. 10-2016-0014508, filed on Feb. 4, 2016 and 10-2016-0123368, filed on Sep. 26, 2016, which are hereby incorporated by reference for all purposes as if fully set forth herein.

BACKGROUND

1. Field of the Disclosure

The present disclosure relates to an uplink transmission/reception technology of a NarrowBand Internet of Things (NB-IoT) user equipment (UE) in $3^{rd}$ generation partnership project (3GPP) long term evolution (LTE)/LTE-Advanced systems. Specifically, the present disclosure relates to a technology for configuring a transmission resource for transmitting HARQ ACK/NACK of an NB-IoT UE, which transmits/receives data using a narrow band.

2. Description of the Related Art

Lately, many Internet of Thing (IoT) devices have been connected to each other through a network worldwidely, and the number of connected IoT devices has been explosively increasing. Accordingly, it is required to develop a technology for processing data transmission and data reception among such explosively increasing IoT devices.

Specifically, many IoT devices are installed in a wide region, and IoT devices require a stable network connection at a low cost and with a low power consumption. Further, the IoT devices transmit or receive, intermittently, a small amount of data. Therefore, applying typical LTE or LTE-Advanced technology to the IoT devices may cause a problem, such as an unnecessary increase in power consumption or an increase in a device cost. Further, since a licensed-band radio resource is limited, there is a limit in supporting communication for many IoT devices.

To solve the above problems, LongRange (LoRa), which is a dedicated network technology for IoT communication using an unlicensed band frequency, and an NB-IoT (NarrowBand IoT) technology developed based on an LTE network technology have been introduced.

In particular, the NB-IoT performs communication using a narrow band to increase device acceptability and reduce power consumption and a cost. Further, the NB-IoT provides a coverage enhancement effect through a technology for repeatedly transmitting data. Further, the NB-IoT may selectively or simultaneously apply a single-tone or multi-tone based data transmission method to each UE.

Therefore, in the case of NB-IoT UEs having different transmission methods, it is required to new transmission timing and radio resource for downlink data reception and uplink signal transmission which are different from those in the typical LTE technology.

SUMMARY OF THE INVENTION

An embodiment conceived of from the above-described background proposes a method for defining time and frequency axis transmission resources for transmitting an uplink signal when different uplink transmission methods are configured.

Further, an embodiment proposes a transmission resource for transmission HARQ ACK/NACK related to downlink data when an NB-IoT UE receives the downlink data.

In accordance with an embodiment for solving the above-described problems, a method may be provided for transmitting an uplink signal by a NarrowBand IoT (Internet of Things) UE. The method may include: receiving downlink data from a base station; generating HARQ ACK/NACK feedback information related to the downlink data; and transmitting the HARQ ACK/NACK feedback information to the base station through a Narrowband Physical Uplink Shared Channel (NPUSCH), wherein the NPUSCH is mapped to a resource unit configured by M subcarriers and K slots where M and K are an natural number.

In accordance with another embodiment, a method may be provided for transmitting an uplink signal by a NarrowBand IoT (Internet of Things) UE. The method may include: receiving downlink data from a base station; generating HARQ ACK/NACK feedback information related to the downlink data; and transmitting the HARQ ACK/NACK feedback information to the base station through a Narrowband Physical Uplink Shared Channel (NPUSCH), wherein the NPUSCH is mapped to a resource unit configured by a single subcarrier and K consecutive subframes where K is a natural number.

In accordance with still another embodiment, a method may be provided for transmitting an uplink signal by a base station. The method may include transmitting downlink data to a NarrowBand IoT (Internet of Things) UE; and receiving HARQ ACK/NACK feedback information through a Narrowband Physical Uplink Shared Channel (NPUSCH), wherein the NPUSCH is mapped to a resource unit configured by M subcarriers and K slots where M and K are an natural number.

In accordance with yet another embodiment, a NarrowBand IoT (Internet of Things) UE may be provided for transmitting an uplink signal. The UE may include a reception unit for receiving downlink data from a base station; a control unit for generating HARQ ACK/NACK feedback information related to the downlink data; and a transmission unit for transmitting the HARQ ACK/NACK feedback information to the base station through a Narrowband Physical Uplink Shared Channel (NPUSCH), wherein the NPUSCH is mapped to a resource unit configured by M subcarriers and K slots where M and K are an natural number.

In accordance with yet another embodiment, a NarrowBand IoT (Internet of Things) UE may be provided for transmitting an uplink signal. The UE may include: a reception unit for receiving downlink data from a base station; a control unit for generating HARQ ACK/NACK feedback information related to the downlink data; and a transmission unit for transmitting the HARQ ACK/NACK feedback information to the base station through a Narrowband Physical Uplink Shared Channel (NPUSCH), wherein the NPUSCH is mapped to a resource unit configured by a single subcarrier and two consecutive subframes.

In accordance with yet another embodiment, a base station may be provided for receiving an uplink signal, the base station comprising: a transmission unit for transmitting downlink data to a NarrowBand IoT (Internet of Things) UE; and a reception unit for receiving HARQ ACK/NACK feedback information through a Narrowband Physical Uplink Shared Channel (NPUSCH), wherein the NPUSCH is mapped to a resource unit configured by M subcarriers and K slots where M and K are an natural number.

In accordance with at least one embodiment described above, time and frequency axis transmission resources may be configured for transmitting an uplink signal to NB-IoT UEs having different uplink signal transmission schemes, thereby preventing the ambiguity of a procedure.

In accordance with at least one embodiment, a concrete procedure and method may be provided for transmitting HARQ ACK/NACK related to downlink data when an NB-IoT UE receives the downlink data.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
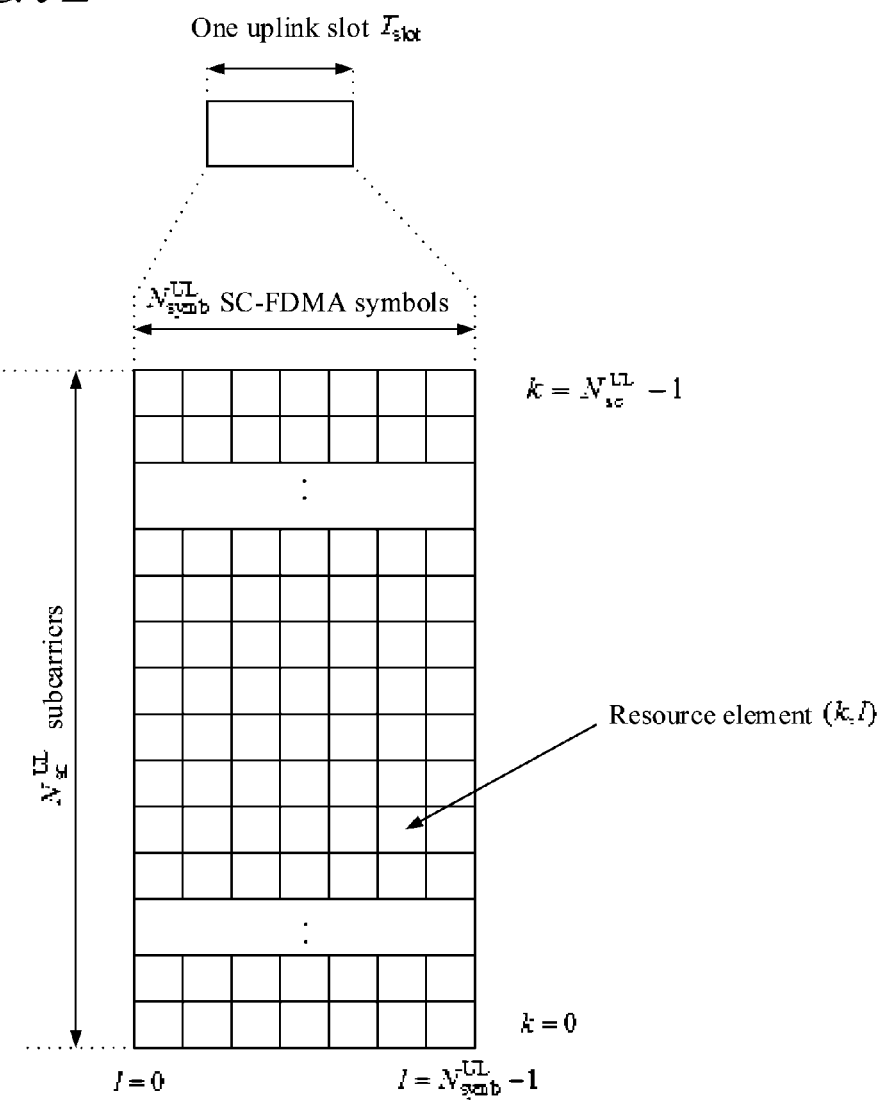
FIG. 1 illustrates a resource grid in an NB-IoT system.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specification, a (machine type communication) MTC terminal refers to a terminal supporting low cost and low complexity or supporting coverage enhancement. Alternatively, in the present specification, the MTC terminal refers to a terminal that is defined as a predetermined category for supporting low costs (or low complexity) and/or coverage enhancement.

In other words, in the present specification, the MTC terminal may refer to a newly defined 3GPP Release 13 low cost (or low complexity) UE category/type, which executes LTE-based MTC related operations. Alternatively, in the present specification, the MTC terminal may refer to a UE category/type that is defined in or before 3GPP Release-12 that supports the enhanced coverage in comparison with the existing LTE coverage, or supports low power consumption. The MTC terminal may also refer to a newly defined Release 13 low cost (or low complexity) UE category/type.

The wireless communication system in the present disclosure may be widely installed to provide various communication services, such as a voice service, packet data, and the like. The wireless communication system may include a User Equipment (UE) and a Base Station (BS or an eNB). Throughout the present specification, the user equipment may be an inclusive concept indicating a terminal used in wireless communication, including a UE (User Equipment) in wideband code division multiple access (WCDMA), LTE, high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed. The base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), a small cell, and the like.

That is, in the present specification, the base station or the cell should be construed as an inclusive concept indicating an area or a function covered by a Base Station Controller (BSC) in CDMA, a NodeB in WCDMA, an eNB or a sector (site) in LTE, and the like, and the concept may include various coverage areas, such as a megacell, a macrocell, a microcell, a picocell, a femtocell, and a communication range of a relay node, an RRH, a small cell, and the like.

Each of the above mentioned various cells has a base station that controls a corresponding cell, and thus, the base station may be construed in two ways. i) the base station may be a device itself that provides a megacell, a macrocell, a microcell, a picocell, a femtocell, and a small cell in association with a wireless area, or ii) the base station may indicate a wireless area itself. In i), all devices that interact with one another to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a user equipment or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the present specification, the user equipment and the base station are used as two inclusive transceiving subjects to embody the technology and technical concepts described in the present specifications. The user equipment and the base station may not be limited to a predetermined term or word. The user equipment and the base station are used as two (uplink or downlink) inclusive transceiving subjects to embody the technology and technical concepts described in the present disclosure, and the user equipment and the base station may not be limited to a predetermined term or word. Here, Uplink (UL) refers to a scheme for a UE to transmit/ receive data to/from a base station, and Downlink (DL) refers to a scheme for a base station to transmit/receive data to/from a UE.

Various multiple access schemes may be unrestrictedly applied to the wireless communication system. Various multiple access schemes may include CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. Embodiments of the present disclosure may be applicable to resource allocation in an asynchronous wireless communication scheme that has been advanced through GSM, WCDMA, and HSPA, to be LTE and LTE-advanced. The embodiments may be applicable to resource allocation in a synchronous wireless communication scheme that has been advanced through CDMA and CDMA-2000, to be UMB. However, embodiments of the present disclosure may not be limited to a specific wireless communication field, and may include all technical fields in which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system, a coordinated multi-antenna transmission system, or a coordinated multi-cell communication system, where two or more transmission/reception points cooperatively transmit a signal. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, an EPDCCH, or a PDSCH may be described through the expression, "a PUCCH, a PUSCH, a PDCCH, EPDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH. The physical downlink control channel may also indicate a meaning including both a PDCCH and an EPDCCH.

In addition, for ease of description, an EPDCCH may be applied to embodiments described using a PDCCH and to embodiments described using an EPDCCH.

Meanwhile, higher layer signaling includes RRC signaling that transmits RRC information including an RRC parameter in the specification.

An eNB executes downlink transmission to terminals. The eNB may transmit a Physical Downlink Shared Channel (PDSCH) which is a primary physical channel for unicast transmission. The eNB may also transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Hereinafter, a method for transmitting HARQ ACK/NACK feedback information related to downlink data reception in a 3GPP communication system by NB-IoT (NarrowBand Internet of Things) UE in accordance with at least one embodiment will be described. In particular, a resource unit structure of an uplink channel and an uplink channel resource allocation method for transmitting the HARQ ACK/NACK feedback information by the NB-IoT UE in accordance with at least one embodiment will be described.

In the present specification, an UE for transmitting/receiving data may be described as a narrow band as NarrowBand IoT UE (NB-IoT UE). The NB-IoT UE refers to a UE which transmits/receives data by using a bandwidth narrower than that used by an existing LTE or LTE-Advanced UE. The NB-IoT UE may be referred as various names, such an MTC terminal. Therefore, the name "NB-IoT UE" is used for convenience and ease of understanding but the embodiments are not limited thereto.

In addition, in order to distinguish the typical LTE-related channel from a channel used by the NB-IoT UE, "N" will be attached in front of a channel name for the NB-IoT. For example, a PDCCH is a downlink control channel in an LTE system, and a NPDCCH is a downlink control channel in NB IoT. A PUSCH is an uplink channel, and an NPUSCH is an uplink channel in the NB IoT. In addition, "N" will be also attached in front of information name, such as system information and signal, for the NB-IoT.

Hereinafter, an NB IoT technology will be briefly described based on related documents in 3GPP.

[NB IoT]

The objective is to specify a radio access for cellular Internet of Things, based to a great extent on a nonbackward-compatible variant of E-UTRA, that addresses improved indoor coverage, support for massive number of low throughput devices, low delay sensitivity, ultra low device cost, low device power consumption and (optimised) network architecture.

The NB IoT supports three operation modes as follow:
1. 'Stand-alone operation' utilizing, for example, the spectrum currently being used by GERAN systems as a replacement of one or more GSM carriers
2. 'Guard band operation' utilizing the unused resource blocks within an LTE carrier's guard-band
3. 'In-band operation' utilizing resource blocks within a normal LTE carrier As described above, the NB-IoT UE may independently operate, and may also operate in a band which has been configured as a guard band of a bandwidth. Further, in addition to the guard band, the NB-IoT UE may operate in a band in which a general LTE UE operates.

Specifically, the NB-IoT UE supports the following operations:
  180 kHz UE RF bandwidth for both downlink and uplink
  OFDMA on the downlink
    Two numerology options will be considered for inclusion: 15 kHz sub-carrier spacing (with normal or extended CP) and 3.75 kHz sub-carrier spacing. Technical analysis will either perform a down-selection or decide on inclusion of both based on the feasibility of meeting relevant requirements while achieving commonality (to be finalized by RAN #70)
  For the uplink, two options will be considered: FDMA with GMSK modulation (as described in 3GPP TR 45.820 section 7.3), and SC-FDMA (including single-tone transmission as a special case of SC-FDMA)
    Technical analysis will either perform a down-selection or decide on inclusion of both
  A single synchronization signal design for the different modes of operation, including techniques to handle overlap with legacy LTE signals
  MAC, RLC, PDCP and RRC procedures based on existing LTE procedures and protocols and relevant optimisations to support the selected physical layer
  Any enhancements to S1 interface to CN and related radio protocols to support the work SA2 is conducting on the systems aspects such as signaling reduction for small data transmissions.

As described above, the NB-IoT UE may transmit or receive a downlink signal and an uplink signal to or from a base station in a bandwidth narrower than that used by the conventional general LTE UE.

Additionally, the NB-IoT UE may transmit an uplink signal through single-tone transmission and multi-tone transmission as follows:
  Single-tone transmissions are supported
    2 numerologies should be configurable for Single-tone transmission: 3.75 kHz and 15 kHz
    A cyclic prefix is inserted
    Frequency domain Sinc pulse shaping in the physical layer description
  Multi-tone transmissions are supported
    Multi-tone transmissions are based on SC-FDMA
    15 kHz UL subcarrier spacing
    Additional mechanisms for PAPR reduction FFS
  The UE shall indicate the support of Single-tone and/or Multi-tone FIG. 1 illustrates a resource grid in an NB-IoT system.

Referring to FIG. 1, an NB-IoT UE transmits or receives uplink and downlink signals, using a bandwidth of about 180 kHz. For example, a resource element for uplink may be defined in NB IoT. The resource element may be defined as an index pair, such as (k, l), including a subcarrier index and a symbol index. In other words, on the time axis, one uplink slot $T_{slot}$ may be configured by $N_{symb}^{UL}$ SC-FDMA symbols. Further, on the frequency axis, $N_{SC}^{UL}$ subcarriers may constitute a bandwidth. As described above, in the case of the NB IoT, about 180 kHz is used to process uplink and downlink signals. One uplink slot may be configured by seven symbols. Further, each subcarrier may be defined to have a frequency of 15 kHz or 3.75 kHz. Therefore, if a 15 kHz subcarrier is allocated, 12 subcarriers may configure one bandwidth, and if a 3.75 kHz subcarrier is allocated, 48 (maximum) subcarriers may configure one bandwidth.

Meanwhile, as described above, the NB-IoT UE supports single-tone transmission and multion transmission. The single-tone transmission is applied with numerologies based on 3.75 kHz and 15 kHz. The multi-tone transmission uses 15 kHz spacing based on SC-FDMA. In other words, the NB-IoT UE selective uses a single-tone based uplink transmission method and a multi-tone based uplink transmission method for uplink transmission.

Further, in case of using single-tone based transmission, uplink numerology based on 3.75 kHz subcarrier spacing and uplink numerology based on 15 kHz subcarrier spacing may be separately configured.

As described above, when different uplink numerologies are applied according to NB-IoT UEs, it is required to newly define a resource for transmitting HARQ ACK/NACK feedback information related to downlink data reception to a base station by an NB-IoT UE.

Figure 2:
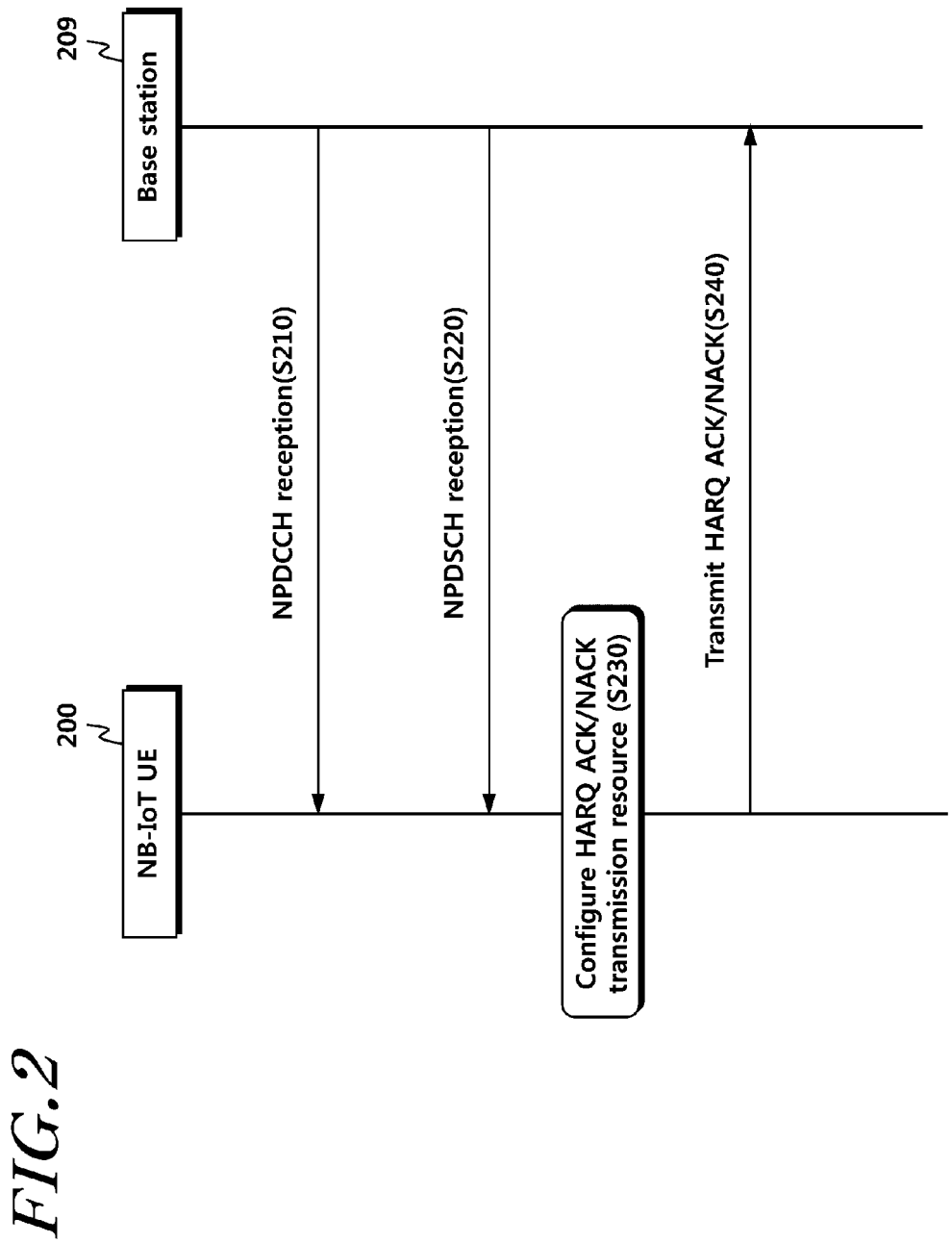
FIG. 2 is a signal diagram for illustrating transmitting downlink data and an uplink signal according to an embodiment.

An HARQ feedback operation of an NB-IoT UE will be briefly described with reference to FIG. 2. FIG. 2 is a signal diagram for illustrating transmitting downlink data and an uplink signal according to an embodiment.

Referring to FIG. 2, an NB-IoT UE 200 receives, from a base station 209, a downlink control channel (NPDCCH) including downlink control information (S210). The NPDCCH may be repeatedly received in at least one subframe or slot, and therefore the NB-IoT UE 200 may obtain a coverage extension effect. The NPDCCH transfers downlink control information for the UE. Further, the downlink control information may include at least one of downlink resource allocation information for downlink data reception, uplink resource allocation information for HARQ ACK/NACK, and control information.

After receiving the NPDCCH from the base station 209, the NB-IoT UE 200 receives a downlink data channel (NPDSCH) by using the downlink resource allocation information included in the downlink control information (S220). The downlink data channel, like the downlink control channel, may also be repeatedly received. The NB-IoT UE 200 decodes the downlink data channel to receive downlink data.

When the receiving of the downlink data is completed, the NB-IoT UE 200 is required to transmit, to the base station 209, information on whether the NB-IoT UE 200 has succeeded in the receiving of the downlink data. To this end, a transmission resource for HARQ ACK/NACK transmission is configured using the uplink resource allocation information of the downlink control information (S230). For example, a transmission resource may be configured by the time axis radio resource and the frequency axis radio resource.

Thereafter, the NB-IoT UE 200 transmits an uplink signal including HARQ ACK/NACK information to the base station 209 in the configured transmission resource. The uplink signal may also be repeatedly transmitted as needed.

Hereinafter, as described with reference to FIG. 2, embodiments of a channel configuration and uplink resource allocation method for transmitting HARQ ACK/NACK feedback information by the NB-IoT UE will be described. The embodiments may be separately performed or some embodiments may be combined and performed together. Further, some operations of one embodiment may be replaced by corresponding operations of the other embodiment, or some operations of one embodiment may be combined with corresponding operations of the other and performed together.

Figure 3:
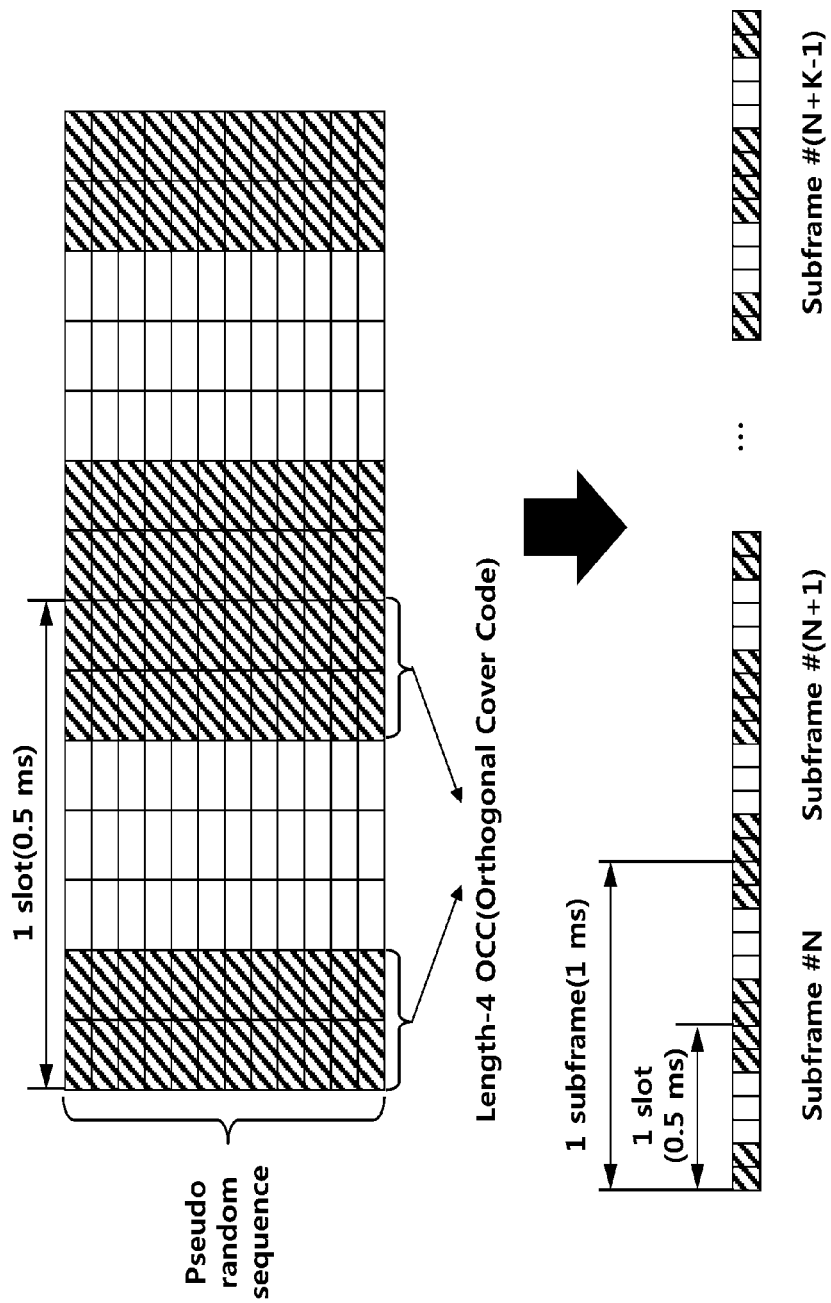
FIG. 3 illustrates a configuration of a PUCCH and an NPUCCH according to an embodiment.

First Embodiment: Method for Transmitting HARQ ACK/NACK Feedback Information by Using Single-Tone Based NPUCCH FIG. 3 illustrates configurations of a PUCCH and an NPUCCH according to an embodiment.

According to an uplink resource allocation method for transmitting DL HARQ ACK/NACK feedback information by an NB-IoT UE with respect to downlink data reception from a base station, the NB-IoT UE may always define a single-tone based NPUCCH regardless of whether the NB-IoT UE supports uplink multi-tone transmission, and the NB-IoT UE may transmit DL HARQ ACK/NACK feedback Uplink Control Information (UCI) through the NPUCCH. In other words, a transmission resource unit of an NPUCCH for transmitting DL HARQ ACK/NACK feedback information by the NB-IoT UE may be configured by one subcarrier on the frequency axis, and the transmission resource unit may be configured by K (one or more) consecutive or non-consecutive uplink subframes on the time axis where K is a natural number.

In this case, with respect to an NPUCCH time-frequency transmission resource configured by identical 1 subcarrier×K subframe(s), a plurality of NPUCCHs may be multiplexed in a code domain as in an existing PUCCH. In other words, as illustrated in FIG. 3, in the case of a PUCCH defined in a legacy LTE system, a plurality of PUCCHs, which have been scrambled by an Orthogonal Cover Codes (OCCs) in units of symbols on the time axis and are orthogonal to each other in the code domain, are configured by a length-12 pseudo random sequence generated in units of subcarriers by a cell ID on the frequency axis within one PRB pair. In the same manner, as in FIG. 3, OCCs may be also applied in units of symbols within one subframe to an NPUCCH for an NB-IoT UE. Additionally, NPUCCH REs of identical symbols in K relevant subframes may also be subject to scrambling according to a pseudo random sequence of a length-K. Alternatively, scrambling may be performed in units of symbols within each single subframe by only the OCCs so that a plurality of NPUCCHs are multiplexed in the code domain within each NPUCCH resource configured by (1 sub-carrier, K subframes).

As described above, the NB-IoT UE may map HARQ ACK/NACK feedback information to an NPUCCH by using a resource unit configured by one subcarrier and K subframes, to transmit feedback information related to downlink data to a base station.

Meanwhile, K, which defines a subframe unit included in a single NPUCCH transmission resource, may be configured to have a random fixed value. For example, K may be defined as 1 (K=1) so that an NPUCCH transmission resource is configured by one subframe unit. Alternatively, K may be also defined as 12 (K=12) so that an NPUCCH transmission resource has a transmission size identical to an existing PUCCH transmission size. However, embodiments are not limited to the above-described values of K. Therefore, K may be configured as a natural number of 1 or greater. Alternatively, a value of K may be received from a base station. For example, a value of K may be received by a UE through cell-specific or UE-specific RRC signaling.

Second Embodiment: Method for Transmitting HARQ ACK/NACK Feedback Information by Using Two Types of NPUCCH Configuration A NB-IoT UE may use a plurality of types of NPUCCH transmission resources (or formats) according to whether the NB-IoT UE supports uplink multi-tone transmission. For example, a single-tone-based type-1 NPUCCH transmission structure may be applied to an NB-IoT UE which supports unlink single-tone transmission, and a multi-tone based type-2 NPUCCH transmission structure may be applied to an NB-IoT UE which supports multi-tone transmission.

In this case, for the multi-tone-based type-2 NPUCCH transmission structure, a PUCCH structure of a legacy LTE system in FIG. 3 may be reused. Alternatively, a type-2 NPUCCH transmission resource may be configured by M consecutive subcarriers on the frequency axis and K consecutive or non-consecutive uplink subframes on the time axis. For example, the type-2 NPUCCH transmission resource may be configured by four consecutive or non-consecutive uplink subframes, each of which is configured by three consecutive subcarriers.

A type-2 NPUCCH transmission resource may also be configured by multiplexing a plurality of type-2 NPUCCHs in a code domain of an identical time-frequency resource. In this case, similarly to the code multiplexing method in the first embodiment, a pseudo random sequence of length-(M×K) may be applied, in the frequency axis, to REs positioned in identical symbols in K relevant subframes. Additionally, an OCC may be applied to each symbol within one subframe. Alternatively, scrambling may be performed in units of symbols within each single subframe by only the OCCs so that a plurality of type-2 NPUCCHs are multiplexed in the code domain within each type-2 NPUCCH resource configured by (M sub-carrier, K subframes). Alternatively, only one NPUCCH may be configured for one NPUCCH time-frequency transmission resource based on M subcarriers×K subframes.

As an example, M, which is the number of subcarriers included in a type-2 NPUCCH transmission resource, and K, which is a subframe unit, may be configured to have random fixed values. For example, in the case of a type-2 NPUCCH transmission resource, M and K may be configured to be fixed values such as 6 (M=6) and 2 (K=2), respectively, or M and K may be configured to be fixed values such as 3 (M=3) and 4 (K=4), respectively, as in an existing PUCCH transmission size or a multi-tone transmission unit of an NPUSCH. However, embodiments are not limited to the above-described values of M and K. Thus the present disclosure may be applied to all values of M and K which are natural numbers equal to or greater than 1.

As another example, according to another method for configuring M and K, a base station may configure a value of M or subcarrier indices according thereto and a value of K, and transmit the configured values to a UE through cell-specific or UE-specific RRC signaling.

As another example, when a type-1 NPUCCH for an NB-IoT UE, which supports single-tone transmission, and a type-2 NPUCCH for an NB-IoT UE, which supports multi-tone transmission, are defined, a base station may transmit the type of NPUCCH supported by a corresponding cell to a UE through cell-specific higher layer signaling.

Third Embodiment: Method for Transmitting HARQ ACK/NACK Feedback Information by Using a NPUSCH According to an uplink resource allocation method for transmitting DL HARQ ACK/NACK feedback information by an NB-IoT UE with respect to downlink data reception from a base station, a resource unit mapped to an NPUSCH may be used.

For example, one time-frequency resource unit for a DL HARQ ACK/NACK feedback based on 1 subcarrier×K subframes may be configured to transmit only HARQ ACK/NACK feedback information for one NB-IoT UE. In this case, the HARQ ACK/NACK feedback information may be transmitted through an NPUSCH in the corresponding radio resource. In this case, in relation to REs used for uplink DM-RS, as in FIG. 3, only a fourth symbol, not third and fifth symbols, of each slot may be used, and the HARQ ACK/NACK feedback information may also be encoded using a tail-bite convolution code and then transmitted. Alternatively, a sequence corresponding to each HARQ ACK/NACK may be defined so that a base station identifies the HARQ ACK/NACK in a corresponding sequence detection scheme.

Here, K may be configured to have a random fixed value. For example, K may be configured as 1 (K=1) so that a NPUSCH resource unit is configured by one subframe unit, or K may be configured as 8 (K=8) in accordance with a NPUSCH transmission unit of single-tone transmission. Alternatively, K may be configured as 12 (K=12). However, the above-described values of K are only exemplary and thus the present disclosure may be applied to all values of M and K which are natural numbers equal to or greater than 1.

According to another method for defining K, the base station may allocate a value of K and transmit the allocated value of K to a UE through cell-specific or UE-specific RRC signaling.

Hereinafter, an operation of transmitting HARQ ACK/NACK feedback information to a base station through an NPUSCH by using a resource unit according to the third embodiment will be described with reference to the accompanying drawings.

Figure 4:
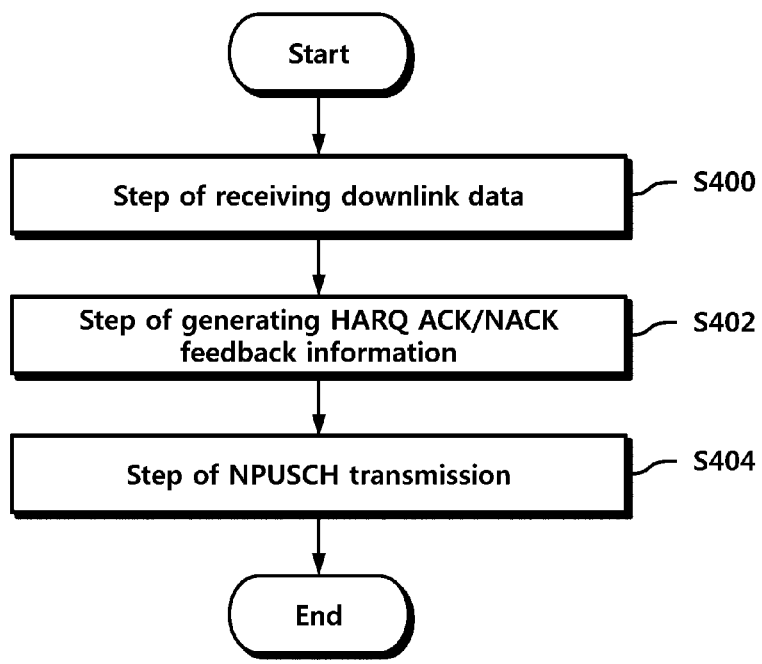
FIG. 4 illustrates an operation of an NB-IoT UE according to an embodiment.

FIG. 4 illustrates an operation of an NB-IoT UE according to an embodiment.

Referring to FIG. 4, the NB-IoT UE receives downlink data from a base station (S400). As described in FIG. 2, the NB-IoT UE may receive the downlink data from the base station through an NPDSCH. The downlink data may be repeatedly received through at least one subframe or slot as needed. Through repeated reception, the NB-IoT UE may be configured to have wide coverage at low power.

Further, the NB-IoT UE generates HARQ ACK/NACK feedback information related to the downlink data (S402). When the NB-IoT UE receives the downlink data, the NB-IoT UE performs a Hybrid Automatic Repeat reQuest (HARQ) process for informing the base station of whether the downlink data has been normally received or has been abnormally received. To this end, the NB-IoT UE generates the HARQ ACK/NACK feedback information related to the downlink data.

Thereafter, the NB-IoT UE transmits the HARQ ACK/NACK feedback information to the base station through a Narrowband Physical Uplink Shared Channel (NPUSCH) (S404). Regardless of whether the NB-IoT UE is a single-tone transmission type or a multi-tone transmission type, the NB-IoT UE transmits the HARQ ACK/NACK feedback information to the base station by using an NPUSCH format. The NPUSCH for transmitting the HARQ ACK/NACK feedback information may be mapped to a resource unit configured by M subcarriers and K slots.

The resource unit for transmitting the HARQ ACK/NACK feedback information may be configured by M subcarriers on the frequency axis and K slots on the time axis.

As an example, M may be a natural number between 1 and 12, and K may be determined by and $2^n$ may be a natural number. In other words, a resource unit is allocated one or more subcarrier units, and K is allocated one among 2, 4, 8, 16, . . . . For example, M may be configured as 1 (M=1) and n may be configured as 2 (n=2). In other words, a resource unit of an NPUSCH for transmitting HARQ ACK/NACK feedback information may be configured by one subcarrier and four slots. As another example, a resource unit may be configured by one subcarrier and two subframes. As another example, a resource unit may be configured by one subcarrier and 16 slots. As another example, a resource unit may be configured by three subcarriers and eight slots. As another example, a resource unit may be configured by six subcarriers and four slots. As another example, a resource unit may be configured by 12 subcarriers and two slots.

Meanwhile, the NB-IoT UE may be configured to have one of a first subcarrier spacing and a second subcarrier spacing. A resource unit for the NB-IoT UE configured to have the first subcarrier spacing may be identical to a resource unit for the NB-IoT UE configured to have the second subcarrier spacing. For example, the first subcarrier spacing may be configured to be four times as large as the second subcarrier spacing. For another example, the second subcarrier spacing may be configured to be four times as large as the first subcarrier spacing. Specifically, the first subcarrier spacing may be configured as 3.75 kHz and the second subcarrier spacing may be configured as 15 kHz. In this case, regardless of which subcarrier the NB-IoT UE has been configured to have, the NB-IoT UE may transmit the HARQ ACK/NACK feedback information to the base station through an NPUSCH by using an identical resource unit.

Figure 5:
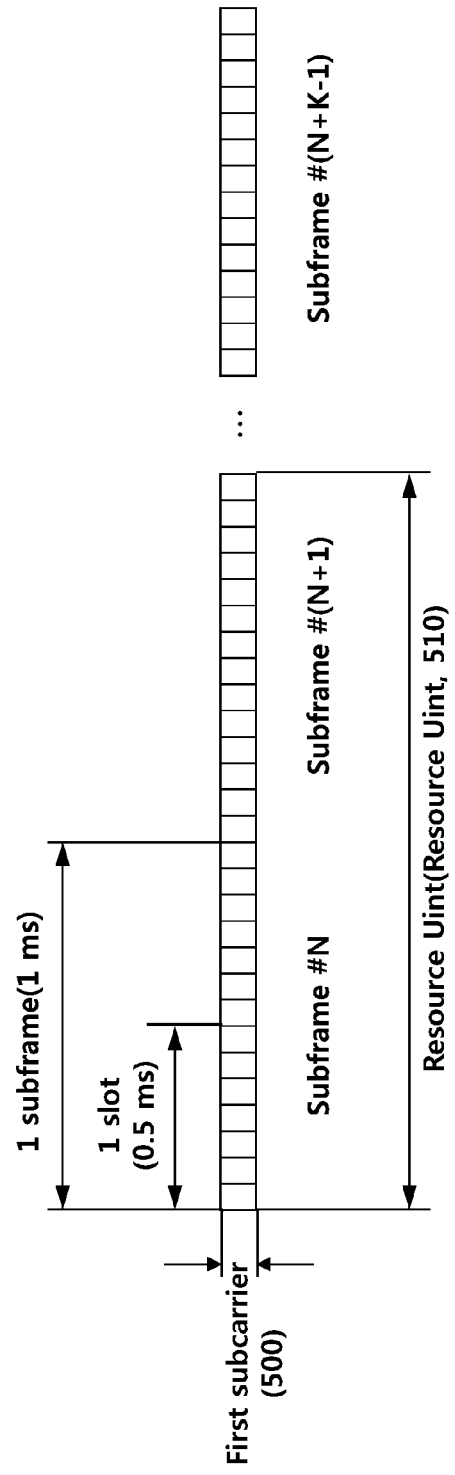
FIG. 5 illustrates a structure of an NPUSCH according to resource unit mapping according to an embodiment.

FIG. 5 illustrates a structure of an NPUSCH according to resource unit mapping according to an embodiment. Referring to FIG. 5, a resource unit 510 of an NPUSCH, through which HARQ ACK/NACK feedback information is transmitted, may be configured by one subcarrier 500 and four slots. In other words, the resource unit 510 may be configured by two consecutive subframes and one subcarrier, and an NB-IoT UE may map the resource unit to the NPUSCH and transmit the HARQ ACK/NACK feedback information to a base station. FIG. 5 illustrates an example of the above-described values of M and K, and thus the resource unit may be determined according to the above-described other values of M and K.

Meanwhile, a resource unit having another size may be configured according to a configured value of subcarrier spacing of the NB-IoT UE. For example, in relation to a resource unit of an NB-IoT UE configured to have a first subcarrier spacing, M and K may be configured as 1 (M=1) and 16 (K=16), respectively. In relation to a resource unit of an NB-IoT UE configured to have a second subcarrier spacing, M and K may be configured as 3 (M=3) an 8 (K=8), respectively.

Alternatively, when two types of NPUSCHs are configured, in the case of the type of NPUSCH through which HARQ ACK/NACK feedback information is transmitted, an identical resource unit size may be configured regardless of a configured value of subcarrier spacing. In contrast, in the case of the type of NPUSCH through which uplink data is transmitted, the size of a resource unit may be differently configured according to the configured value of subcarrier spacing.

The subcarrier spacing may be dynamically configured by a base station with respect to an NB-IoT UE. For example, the base station may add a value indicating subcarrier spacing information of the corresponding NB-IoT UE to random access response information to transmit the subcarrier spacing information. The NB-IoT UE may communicate with the base station by using the received subcarrier spacing information.

Figure 6:
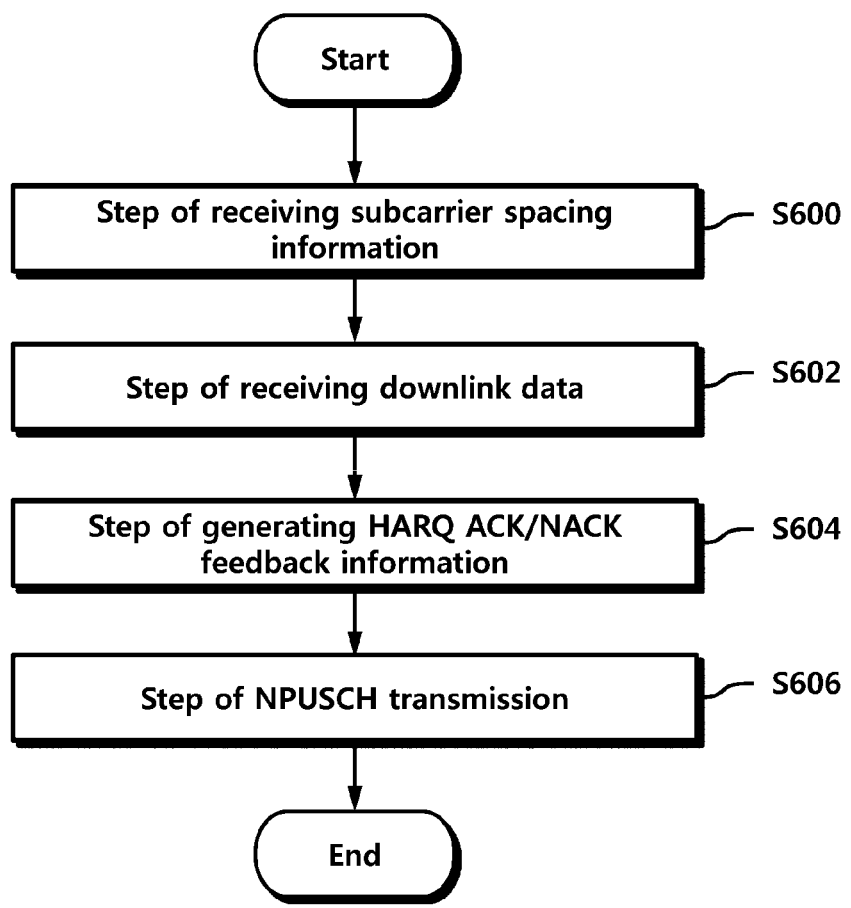
FIG. 6 illustrates an operation of an NB-IoT UE for receiving subcarrier spacing information according to an embodiment.

FIG. 6 illustrates an operation of an NB-IoT UE for receiving subcarrier spacing information according to an embodiment.

Referring to FIG. 6, the NB-IoT UE may receive the subcarrier spacing information from a base station (S600). For example, when the NB-IoT UE performs a random access procedure with the base station, the NB-IoT UE may receive subcarrier spacing information thereof through a random access response. The NB-IoT UE may determine units of subcarriers by using the received subcarrier spacing information. For example, subcarrier spacing may be indicated by 3.75 kHz or 15 kHz, as described above.

The NB-IoT UE may receive downlink data from the base station by applying the subcarrier spacing, and the downlink data may be repeatedly received through one or more subframes as needed (S602).

With respect to the received downlink data, the NB-IoT UE may generate HARQ ACK/NACK feedback information using the above-described method (S604), and may map a resource unit, which has been determined by the above-described method, to an NPUSCH and transmit the NPUSCH to the base station (S606). As an example, a resource unit may be configured by an identical number of subcarriers and slots, regardless of a subcarrier spacing value configured with respect to the NB-IoT UE.

Meanwhile, an NB-IoT UE receives downlink data from a base station, generates the HARQ ACK/NACK feedback information related to the downlink data, and transmits the generated HARQ ACK/NACK feedback information to the base station through an NPUSCH. The NPUSCH may be mapped to a resource unit configured by a single subcarrier and K consecutive subframes. In other words, as described in FIG. 5, a resource unit may be configured by one subcarrier and K consecutive subframes. For example, K may be configured as 2 (K=2). In this case, a resource unit is configured by one subcarrier and two consecutive subframes. As described above, the NB-IoT UE transmits HARQ ACK/NACK feedback information in an identical resource unit size, regardless of configured subcarrier spacing. Therefore, a resource unit may vary according to the subcarrier spacing as described below.

For example, when the NB-IoT UE is configured to have 3.75 kHz subcarrier spacing, the resource unit may be configured by units having a band of 3.75 kHz on the frequency axis and consecutive intervals of 2 ms on the time axis. For example, when the NB-IoT UE is configured to have 15 kHz subcarrier spacing, the resource unit may be configured by units having a band of 15 kHz on the frequency axis and consecutive intervals of 2 ms on the time axis.

As described above, a resource unit different from a resource block, which is a HARQ ACK/NACK transmission unit in the legacy LTE system, is determined, and thus HARQ ACK/NACK feedback information related to many NB-IoT UEs can be processed by using a limited radio resource.

Hereinafter, an operation of a base station according to embodiments will be described.

Figure 7:
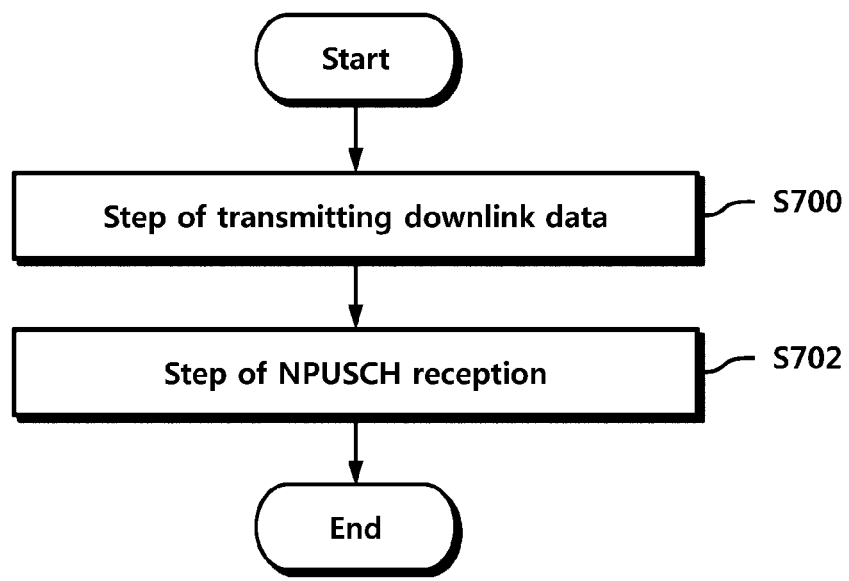
FIG. 7 illustrates an operation of a base station according to an embodiment.

FIG. 7 illustrates an operation of a base station according to an embodiment.

Referring to FIG. 7, the base station may transmit downlink data to an NB-IoT UE (S700). The base station may repeatedly transmit the downlink data by using one or more subframes or slots.

The base station may receive HARQ ACK/NACK feedback information related to the downlink data through a Narrowband Physical Uplink Shared Channel (NPUSCH) (S702). In this case, the NPUSCH is mapped to a resource unit configured by M subcarriers and K slots.

For example, M may be a natural number between 1 and 12, and K may be determined by $2^n$ and n may be a natural number. In other words, the resource unit is allocated one or more subcarrier units, and K is allocated one among 2, 4, 8, 16, . . . . For example, M may be configured as 1 (M=1), and n may be configured as 2 (n=2). In other words, a resource unit of an NPUSCH for transmitting HARQ ACK/NACK feedback information may be configured by one subcarrier and four slots. For another example, a resource unit may be configured by one subcarrier and two subframes. For still another example, a resource unit may be configured by one subcarrier and 16 slots. For yet another example, a resource unit may be configured by three subcarriers and eight slots. For yet another example, a resource unit may be configured by six subcarriers and four slots. For yet another example, a resource unit may be configured by 12 subcarriers and two slots.

Figure 8:
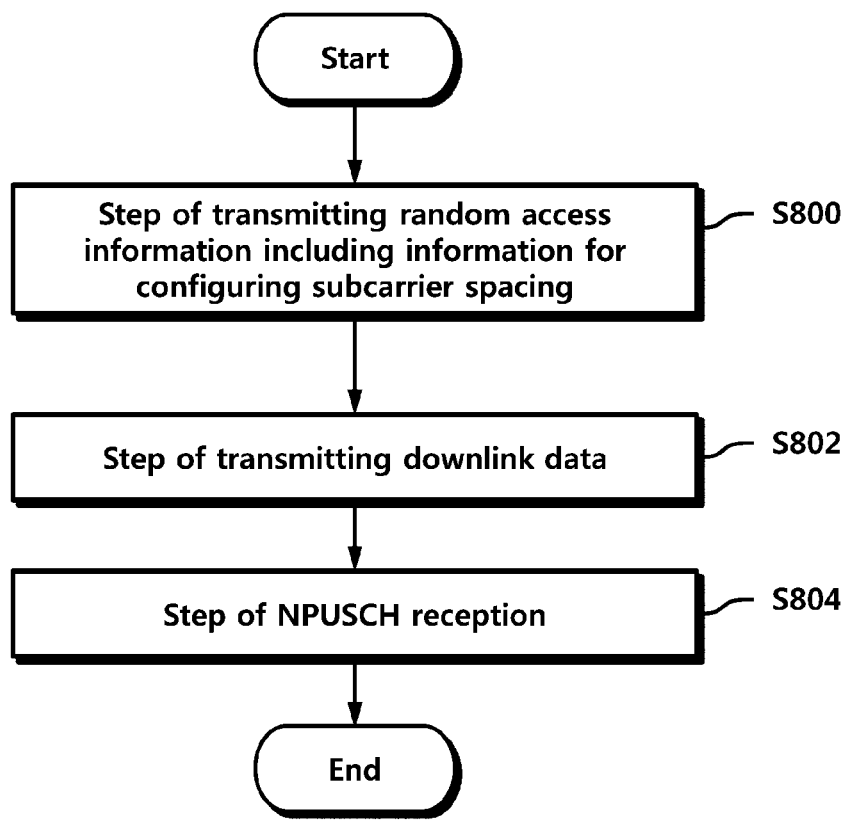
FIG. 8 illustrates an operation of a base station for transmitting subcarrier spacing information according to an embodiment.

FIG. 8 illustrates an operation of a base station for transmitting subcarrier spacing information according to an embodiment.

Referring to FIG. 8, the base station may transmit information for configuring subcarrier spacing with respect to an NB-IoT UE (S800). The information for configuring subcarrier spacing may be transmitted through a random access response. Thereafter, the base station may transmit downlink data to the NB-IoT UE as in the above operation S700 and the above operation S702 (S802), and the base station may receive HARQ ACK/NACK feedback information through an NPUSCH (S804).

As described above, through the operation S800, the NB-IoT UE may be configured to have one of a first subcarrier spacing and a second subcarrier spacing.

In this case, a resource unit for the NB-IoT UE configured to have the first subcarrier spacing may be identical to a resource unit for the NB-IoT UE configured to have the second subcarrier spacing. For example, the first subcarrier spacing may be configured to be four times as large as the second subcarrier spacing. For another example, the second subcarrier spacing may be configured to be four times as large as the first subcarrier spacing. Specifically, the first subcarrier spacing may be configured as 3.75 kHz and the second subcarrier spacing may be configured as 15 kHz. In this case, regardless of which subcarrier spacing the NB-IoT UE has been configured to have, the base station may receive the HARQ ACK/NACK feedback information through an NPUSCH by using an identical resource unit. If the base station receives uplink data other than HARQ ACK/NACK feedback information through the NPUSCH, K and M of a resource unit may be configured to have different values according to subcarrier spacing of an NB-IoT UE which transmits the uplink data.

Meanwhile, regardless of the above-described time-frequency resource structure of the NPUCCH or the NPUSCH, the NB-IoT UE may transmit feedback information related to HARQ ACK/NACK on the basis of a message. In other words, the NB-IoT UE may use a time-frequency resource of an NPUCCH or an NPUSCH, which has been defined by encoding HARQ ACK/NACK feedback information through the same method as a NPUSCH encoding method.

Configurations of an NB-IoT UE and a base station according to embodiments will be described with reference to drawings.

Figure 9:
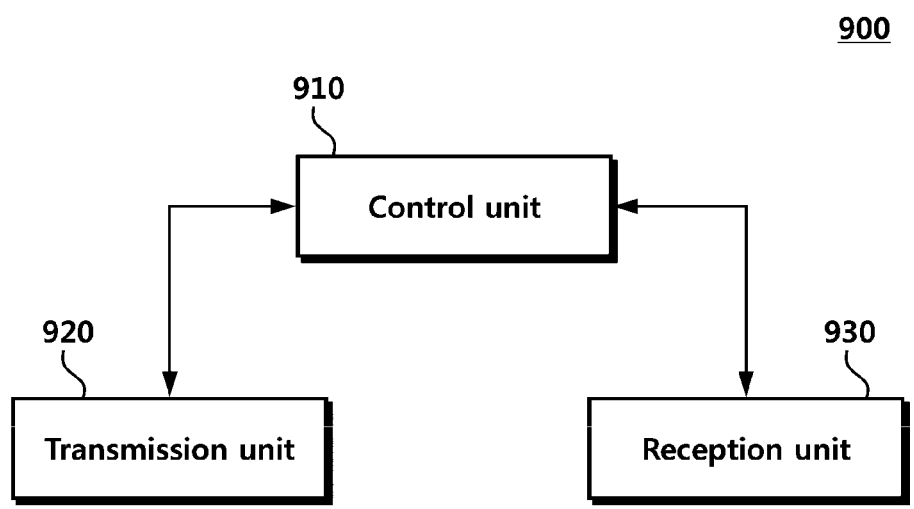
FIG. 9 illustrates a configuration of an NB-IoT UE according to an embodiment.

FIG. 9 illustrates a configuration of an NB-IoT UE according to an embodiment.

Referring to FIG. 9, an NB-IoT UE 900 includes: a reception unit 930 for receiving downlink data from a base station; a control unit 910 for generating HARQ ACK/NACK feedback information related to the downlink data; and a transmission unit 920 for transmitting the HARQ ACK/NACK feedback information to the base station through an NPUSCH. In this case, the NPUSCH is mapped to a resource unit configured by M subcarriers and K slots.

Further, the reception unit 930 may repeatedly receive the downlink data through at least one subframe or slot as needed. Further, the reception unit 930 may further receive information for configuring subcarrier spacing from the base station. In addition, the reception unit 930 may receive downlink control information, downlink data, and a message from the base station through a corresponding channel. As described above, a first subcarrier spacing may be configured to be four times as large as a second subcarrier spacing, and the NB-IoT UE may be configured to have the first subcarrier spacing or the second subcarrier spacing. For another example, a second subcarrier spacing may be configured to be four times as large as a first subcarrier spacing, and the NB-IoT UE may be configured to have the first subcarrier spacing or the second subcarrier spacing. The information for configuring subcarrier spacing may be received through a random access response.

The control unit 910 controls overall operations of the NB-IoT UE for generating HARQ ACK/NACK feedback information and transmitting the HARQ ACK/NACK feedback information to the base station through an NPUSCH. In this case, the NPUSCH is mapped to a resource unit configured by M subcarriers and K slots. M is a natural number between 1 and 12, and K is determined by and n may be configured as a natural number. For example, M is 1 and n may be configured as 2. In addition, as described using FIG. 4 to FIG. 8, a value of M and of n or K may be variously configured.

Alternatively, the NPUSCH may be mapped to a resource unit configured by M subcarriers and K consecutive subframes. For example, M is configured as 1 (M=1) and K is configured as 2 (K=2), and thus two consecutive subframes and one subcarrier may be allocated to a resource unit.

Further, a resource unit for the NB-IoT UE configured to have the first subcarrier spacing and a resource unit for the NB-IoT UE configured to have the second subcarrier spacing may be configured to be identical to each other. In other words, regardless of a configuration of subcarrier spacing, the NB-IoT UE may transmit HARQ ACK/NACK feedback information to the base station through an NPUSCH using identical resource unit configuration. In addition, the control unit 910 controls, when different uplink numerologies are applied according to NB-IoT UEs required to perform the above-described embodiments, the overall operation of each NB-IoT UE, which is required to perform a resource unit configuration method for giving HARQ ACK/NACK feedback to uplink by the NB-IoT UE with respect to downlink data reception.

The transmission unit 920 transmits uplink control information, uplink data, and a message to the base station through a corresponding channel.

Figure 10:
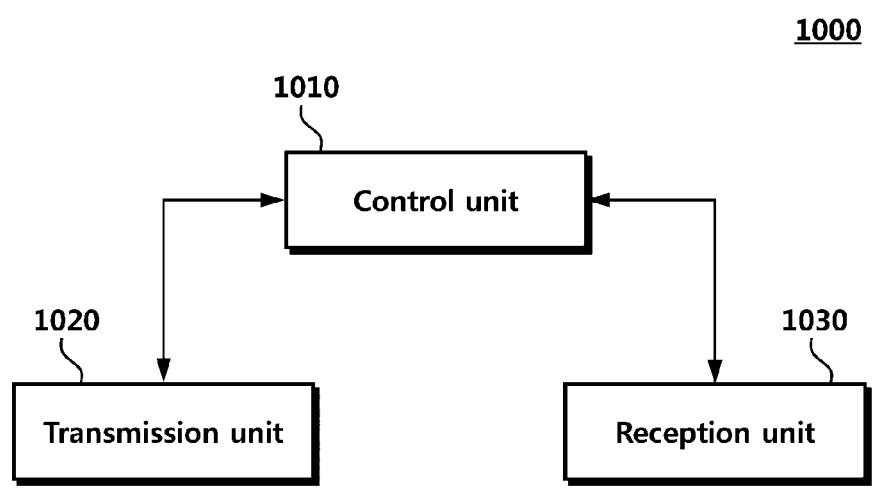
FIG. 10 illustrates a configuration of a base station according to an embodiment.

FIG. 10 illustrates a configuration of a base station according to an embodiment.

Referring to FIG. 10, a base station 1000 includes: a transmission unit 1020 for transmitting downlink data to an NB-IoT UE; and a receiving unit 1030 for receiving HARQ ACK/NACK feedback information related to the downlink data through an NPUSCH. In this case, the NPUSCH may be mapped to a resource unit configured by M subcarriers and K slots.

The transmission unit 1020 may repeatedly transmit the downlink data through at least one subframe or slot as needed. Further, the transmission unit 1020 may further transmit information for configuring subcarrier spacing. In addition, the transmission unit 1020 may transmit downlink control information, downlink data, and a message through a corresponding channel. As described above, a first subcarrier spacing may be configured to be four times as large as a second subcarrier spacing, and the NB-IoT UE may be configured to have the first subcarrier spacing or the second subcarrier spacing. For another example, the second subcarrier spacing may be configured to be four times as large as the first subcarrier spacing, and the NB-IoT UE may be configured to have the first subcarrier spacing or the second subcarrier spacing. The transmission unit 1020 may include the information for configuring subcarrier spacing in a random access response to transmit the information.

A control unit 1010 may control operations of base station for configuring subcarrier spacing of the NB-IoT UE. Further, the control unit 1010 controls, when different uplink numerologies are applied according to NB-IoT UEs required to perform the above-described embodiments, the overall operation of each NB-IoT UE, which is required to perform a resource unit configuration method for receiving HARQ ACK/NACK feedback to uplink by the NB-IoT UE with respect to downlink data reception.

The reception unit 1030 receives HARQ ACK/NACK feedback information through an NPUSCH. In this case, the NPUSCH is mapped to a resource unit configured by M subcarriers and K slots. M is a natural number between 1 and 12, and K is determined by $2^n$ and n may be configured as a natural number. For example, M is 1 and n may be configured as 2. In addition, as described using FIG. 4 to FIG. 8, a value of M and of n or K may be variously configured.

Alternatively, the NPUSCH may be mapped to a resource unit configured by M subcarriers and K consecutive slots. For example, M is configured as 1 (M=1) and K is configured as 2 (K=2), and thus two consecutive subframes and one subcarrier may be allocated to a resource unit.

Further, a resource unit in a case where the NB-IoT UE is configured to have the first subcarrier spacing and a resource unit in a case where the NB-IoT UE is configured to have the second subcarrier spacing may be configured to be identical to each other. In other words, regardless of subcarrier spacing configured with respect to each NB-IoT UE, the base station may receive HARQ ACK/NACK feedback information through an NPUSCH by means of an identical resource unit configuration.

In addition, the transmission unit 1020 and the reception unit 1030 is used to transmit or receive a signal, a message, or data, which is required to perform the above-described embodiments, from or to the NB-IoT UE.

Standard contents or standard documents, set forth in the above-described embodiments, have been omitted for a brief description, and constitute a part of the present specification. Therefore, it is should interpreted that adding some of the above standard contents and some contents of the above standard documents to the present specification or describing them in claims will fall within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, the disclosed embodiments of the present disclosure have not been described for limiting the technical idea of the present disclosure. The scope of the present disclosure shall be construed on the basis of the accompanying claims in such a manner that all of the technical ideas included within the scope equivalent to the claims belong to the present disclosure.

What is claimed is:

1. A method for transmitting an uplink signal by a NarrowBand Internet of things (IoT) user equipment (UE) comprising:
    receiving downlink data from a base station;
    generating hybrid automatic repeat request (HARQ) ACK/NACK feedback information related to the downlink data; and
    transmitting the HARQ ACK/NACK feedback information to the base station through a resource unit of a NarrowBand Physical Uplink Shared Channel (NPUSCH),
    wherein the resource unit of the NPUSCH is made up of M subcarriers and K slots, where K is determined as $2^n$ where M and n are natural numbers,
    wherein the NarrowBand IoT UE is configured to have one of a first subcarrier spacing and a second subcarrier spacing, and
    wherein when HARQ ACK/NACK feedback information is transmitted through the NPUSCH, values of M and K when the NarrowBand IoT UE is configured to have the first subcarrier spacing are the same as values of M and K when the NarrowBand IoT UE is configured to have the second subcarrier spacing.

2. The method of claim 1, wherein the second subcarrier spacing is configured to be four times as large as the first subcarrier spacing.

3. A method for receiving an uplink signal by a base station, comprising:
    transmitting downlink data to a NarrowBand IoT (Internet of Things) user equipment (UE); and
    receiving hybrid automatic repeat request (HARQ) ACK/NACK feedback information related to the downlink data through a resource unit of a Narrowband Physical Uplink Shared Channel (NPUSCH)
    wherein the resource unit of the NPUSCH is made up of M subcarriers and K slots, where K is determined as $2^n$ where M and n are natural numbers,
    wherein the NarrowBand IoT UE is configured to have one of a first subcarrier spacing and a second subcarrier spacing, and
    wherein when HARQ ACK/NACK feedback information is transmitted through the NPUSCH, values of M and K when the NarrowBand IoT UE is configured to have the first subcarrier spacing are the same as values of M and K when the NarrowBand IoT UE is configured to have the second subcarrier spacing.

4. The method of claim 3, wherein the information for configuring the subcarrier spacing is included in random access response information to be transmitted.

5. A NarrowBand Internet of things (IoT) user equipment (UE) for transmitting an uplink signal, the NarrowBand IoT UE comprising:
    a receiver configured to receive downlink data from a base station;
    a controller configured to generate hybrid automatic repeat request (HARQ) ACK/NACK feedback information related to the downlink data; and
    a transmitter configured to transmit the HARQ ACK/NACK feedback information to the base station through a resource unit of a Narrowband Physical Uplink Shared Channel (NPUSCH),
    wherein the resource unit of the NPUSCH is made up of M subcarriers and K slots, where K is determined as $2^n$ where M and n are natural numbers,
    wherein the NarrowBand IoT UE is configured to have one of a first subcarrier spacing and a second subcarrier spacing, and
    wherein when HARQ ACK/NACK feedback information is transmitted through the NPUSCH, values of M and K when the NarrowBand IoT UE is configured to have the first subcarrier spacing are the same as values of M and K when the NarrowBand IoT UE is configured to have the second subcarrier spacing.

6. The NarrowBand IoT UE of claim 5, wherein the second subcarrier spacing is configured to be four times as large as the first subcarrier spacing.

* * * * *